United States Patent [19]
Hart

[11] Patent Number: 5,934,765
[45] Date of Patent: Aug. 10, 1999

[54] ELECTRO-PNEUMATIC BRAKE SYSTEM AND CONTROLLER THEREFOR

[75] Inventor: James E. Hart, Trafford, Pa.

[73] Assignee: Westinghouse Air Brake Company, Wilmerding, Pa.

[21] Appl. No.: 08/770,584

[22] Filed: Dec. 19, 1996

[51] Int. Cl.[6] .......................................................... B60T 8/18
[52] U.S. Cl. ...................... 303/22.7; 303/22.8; 303/9.69
[58] Field of Search .................. 303/22.1, 22.6, 303/22.7, 22.8, 3, 15, 20, 40, 9.69, 9.75

[56] References Cited

U.S. PATENT DOCUMENTS

| | | | |
|---|---|---|---|
| 3,814,483 | 6/1974 | Coiner et al. ................................ | 303/3 |
| 3,838,893 | 10/1974 | Dalibout et al. ........................ | 303/22.6 |
| 4,441,764 | 4/1984 | Newton ..................................... | 303/40 |
| 4,572,586 | 2/1986 | Washbourn ........................ | 303/22.7 X |
| 5,669,674 | 9/1997 | McKay et al. ..................... | 303/22.6 X |

*Primary Examiner*—Lee W. Young
*Attorney, Agent, or Firm*—James Ray & Associates

[57] ABSTRACT

A brake control system for a railroad freight car having an electro-pneumatic brake controller in which a self-lapping valve assembly is operated by a constant spring load acting through a first class operating lever. An electric stepping motor under control of a microprocessor is employed to change the fulcrum point of the operating lever and thereby vary the ratio of the operating lever in order to obtain different braking pressures from the self-lapping valve assembly according to an electric control signal transmitted to the microprocessor.

15 Claims, 2 Drawing Sheets

5,934,765

ELECTRO-PNEUMATIC BRAKE SYSTEM AND CONTROLLER THEREFOR

BACKGROUND OF THE INVENTION

The present invention relates to electro-pneumatic brake controllers and, particularly, to an electric motor operated brake controller suitable for establishing pneumatic output pressure for a railroad car brake in a "directs" type electro-pneumatic brake system.

In the evolution of railroad freight train braking from conventional automatic pneumatic control to electro-pneumatic control, as presently envisioned, it is believed that, until all freight cars can be equipped for electro-pneumatic braking, an "indirect" form of electro-pneumatic braking may be initially employed. Such "indirect" brake control implies controlling brake pipe pressure electrically at one or more locations remotely spaced from the locomotive, with the conventional control valve on each car in a train responding to the brake pipe pressure variation in the usual manner to control the car brakes. In this way, faster and more uniform brake response can be achieved throughout a train of railroad cars.

Eventually, however, "indirect" electro-pneumatic control is expected to give way to "direct" electro-pneumatic brake control. Such "direct" electro-pneumatic control implies the electric control of brake cylinder pressure at each car in a train independent of the car control valve device, as opposed to electric control of the train brake pipe pressure to indirectly control brake cylinder pressure.

In direct electro-pneumatic brake control systems, such as shown in U.S. Pat. No. 5,501,512, each car is provided with a microprocessor unit, which receives a control signal corresponding to the level of braking desired. A pressure to electric transducer is employed to provide the microprocessor with a feedback signal consistent with the instantaneous brake cylinder pressure. Solenoid-operated pneumatic valves regulate the brake cylinder pressure according to the difference between these control and feedback signals. Such pressure transducers are known to be sensitive to temperature variations and are expensive to maintain due to the need for periodic calibration, which the afore-mentioned patent addresses. Moreover, the capacity of the solenoid-operated pneumatic valves, as required for brake cylinder pressurization, results in high power consumption for their operation.

SUMMARY OF THE INVENTION

A primary object of the present invention is to provide a direct electro-pneumatic type brake control system, having a brake controller device which obviates the need for feedback pressure transducers.

Another object is to provide a direct electro-pneumatic brake controller which is economical to manufacture.

Yet another object is to provide such a brake controller which requires relatively low electrical power to operate.

In carrying out these objectives, there is provided an electro-pneumatic brake controller comprising a self-lapping relay valve assembly which is operated by a fixed spring acting through a variable ratio operating lever. A linear electric motor positions a movable fulcrum roller along the operating lever to vary the lever ratio and accordingly the input demand to the relay valve assembly in order to develop a desired brake cylinder pressure.

In applying such an electro-pneumatic brake controller in an electro-pneumatic brake system for each car of a railroad train, a processing unit on each car receives a command signal and controls the linear electric motor to precisely set the location of the operating lever fulcrum roller. The set position of the fulcrum roller from a fixed release reference position can be tracked by the microprocessor unit, based on motor revolution count. The brake cylinder pressure at each car can thus be developed without requiring feedback transducers to monitor brake pipe pressure or brake cylinder pressure. Moreover, brake pipe pressure can be maintained (constantly charged) at the train operating pressure as a source of pneumatic power for supplying the car brakes and as a pneumatic backup or emergency control in conjunction with the traditional car control valve device.

BRIEF DESCRIPTION OF THE DRAWINGS

These and other objects and advantages of the invention will become apparent from the following more detailed explanation when taken in conjunction with the accompanying drawings in which.

DESCRIPTION AND OPERATION

Figure 1:
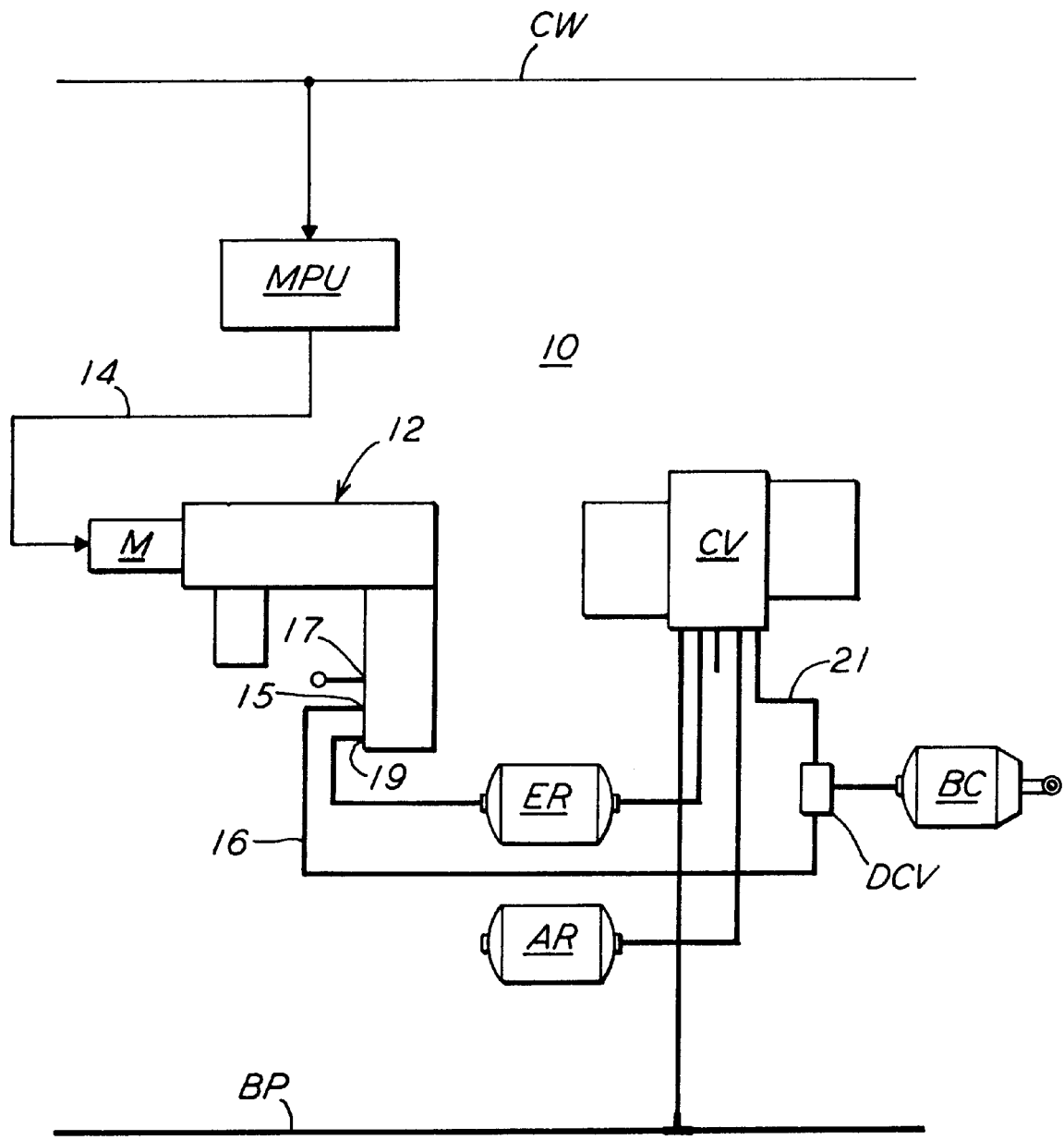
FIG. 1 is a system diagrammatic showing one form of a direct type electro-pneumatic brake system interfaced with a conventional automatic pneumatic brake system on a railroad freight car.

As shown in FIG. 1, there is provided for each car of a railroad train an electro-pneumatic brake control system 10 including a brake pipe BP, a brake controller 12 having a linear electric motor M, and a microprocessor unit MPU to which is connected a control wire CW which extends through each car and is interconnected at each end to the control wire of the adjoining car for transmitting control signals to microprocessor unit MPU. Alternatively, a radio signal transmission link between cars may be employed to transmit control signals to the respective car microprocessors. Microprocessor unit MPU outputs electrical signals to a transistor switching network (not shown) associated with motor M via wiring cable 14, such switching network being well known for controlling operation of motor M in the fashion of a stepping motor in accordance with a control signal transmitted to the microprocessor unit MPU via control wire CW.

A delivery port 15 of brake controller 12 is connected via a pipe 16 to one inlet of a double check valve DCV. An exhaust port 17 is vented to atmosphere and a supply port 19 is connected via pipe to a source of supply pressure. In the case of a freight car having conventional brake equipment, such as the well-known AB type equipment, the existing emergency reservoir ER may be utilized to provide the source of supply pressure, as shown. The emergency reservoir ER is charged via the car control valve CV in its "release and charging" position. In "service application" position, control valve CV connects air via a pipe 21 to the other inlet of double check valve DCV from an auxiliary reservoir AR, which is also charged from brake pipe BP in "release and charging" position. An outlet of double check valve DCV is connected by a pipe to brake cylinder BC. In such an arrangement, a freight car equipped with automatic pneumatic brakes may be retrofitted with the electro-pneumatic brake of the present invention to provide a cost-effective improvement to the existing brake system. In addition, the existing automatic pneumatic brake provides a convenient back-up brake for the electro-pneumatic brake.

It is to be understood that the invention is not intended to be limited to such retrofit application, however. In a broader aspect of the invention, for example, the automatic pneumatic brake control could be eliminated, including control valve CV and emergency reservoir ER, with a separate supply reservoir charged directly from brake pipe via a one-way check valve providing the source of supply pressure. Such an arrangement, however, would not encompass the afore-mentioned automatic pneumatic back-up feature.

Figure 2:
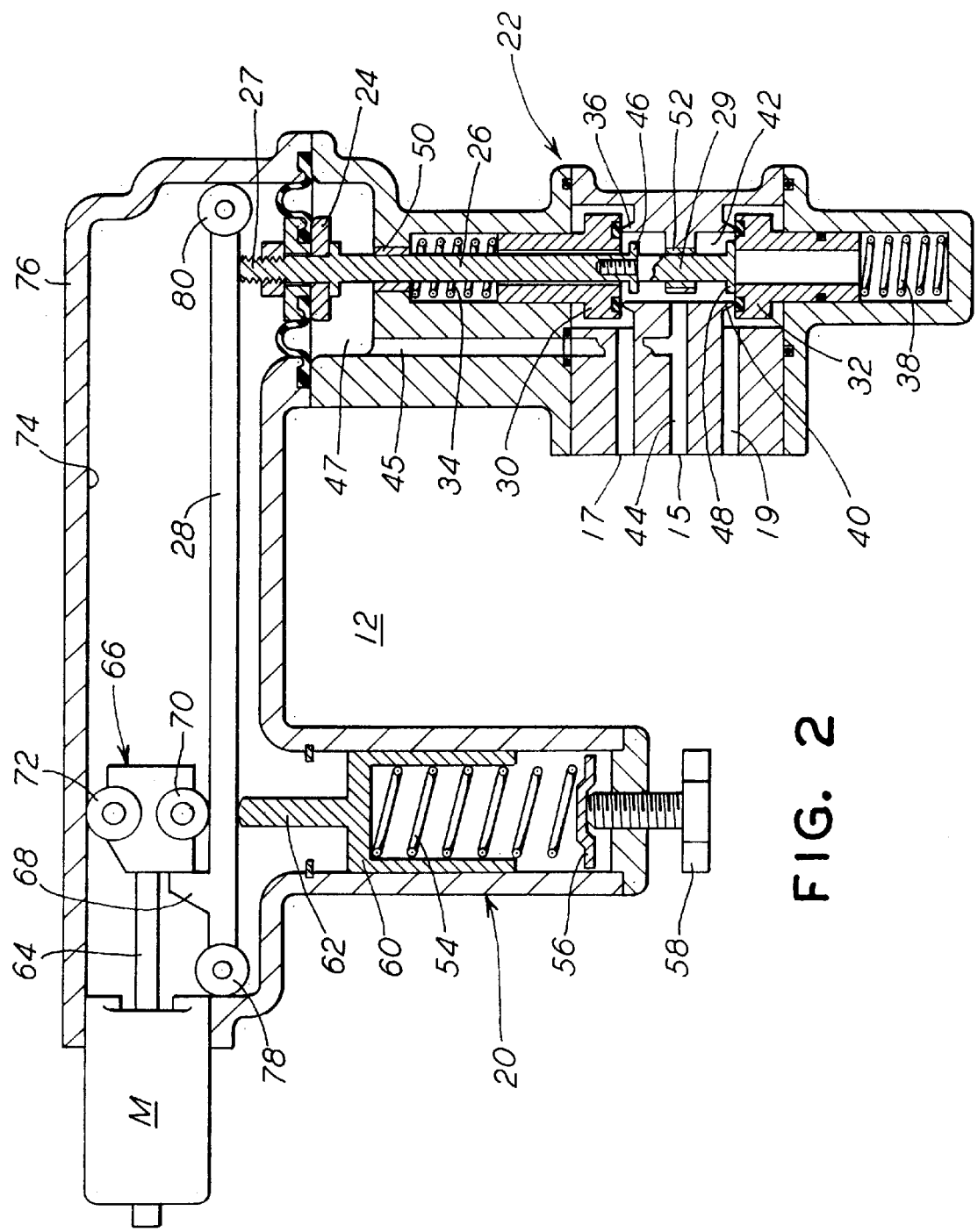
FIG. 2 is an assembly sectional view of an electro-pneumatic brake controller as employed in the brake system of FIG. 1, in accordance with the present invention.

Referring now to FIG. 2, brake controller 12 includes, in addition to linear motor M, a force actuator unit 20 and a self-lapping relay valve assembly 22.

A feedback piston 24 of self-lapping relay valve assembly 22 is fixed to an actuating stem 26, one end 27 of which is engageable with a variable ratio operating lever 28 and the other end 29 of which is disposed intermediate an exhaust poppet valve member 30 and an axially opposed supply poppet valve member 32. Exhaust valve member 30 is biased in one direction by a spring 34 toward engagement with an annular valve seat 36 and supply valve member 32 is biased in the opposite direction by a spring 38 toward engagement with an annular valve seat 40 which is axially spaced from valve seat 36. Formed between valve seats 36,40 and valve members 30,32 is a delivery chamber 42 which is connected to brake cylinder delivery port 15 via a passage 44. A branch passage 45 is connected between passage 44 and a feedback chamber 47 in which piston 24 operates. Within delivery chamber 42, the other end 29 of actuating stem 26 is formed with a flange 46 that is located adjacent valve member 32 for engaging and unseating one or the other of the respective valve members 30,32, depending on the direction of movement of actuating stem 26. A bushing 50 guidably supports actuating stem 26 near its one end 27 and another bushing 52 guidably supports stem 26 at its other end 29, preferably in an area intermediate flanges 46,48.

Force actuator unit 20 includes a helical power spring 54 which acts between a spring seat 56 having an adjusting screw 58 engaged therewith and an actuating plunger 60. A stem 62 of plunger 60 is engaged with operating lever 28 adjacent an end thereof opposite the end with which actuating stem 26 is engaged.

Electric motor M is connected by its output shaft 64 to a fulcrum member 66 in order to move fulcrum member 66 along lever 28 between a full release position in one direction of movement and a full application position in the opposite direction of movement. At the end of lever 28 adjacent stem 62 of plunger 60, there is formed a limit abutment 68 with which the one side of fulcrum member 66 is engageable to establish full release position of controller 12. In this full release position, a fulcrum roller 70 engages the upper side of lever 28 at a location aligned axially opposite the location at which stem 62 of plunger 60 engages the underside of lever 28. In the other extreme direction of movement, fulcrum member 66 abuts the controller body such that roller 70 engages the upper side of lever 28 at a limit position between the axis of actuating stem 26 of self-lapping assembly 22 and the lever midpoint.

In addition to roller 70, fulcrum member 66 includes a bearing roller 72 that rides along a bearing surface 74 provided by the underside of the controller cover 76, such bearing surface being generally parallel to lever 28 in the lap position of self-lapping unit 22, i.e., when the exhaust valve 30 and supply valve 32 are both closed.

Lever 28 is also provided with end rollers 78,80 which are adapted to engage the side walls of cover 76 to stabilize lever 28 horizontally, as viewed in the drawing.

In the shown full release position of fulcrum member 66, in which rollers 70,72 of fulcrum member 66 are aligned with plunger stem 62, no force is transferred from power spring 54 to self-lapping valve assembly actuating stem 26 via lever 28. In the absence of brake cylinder pressure, feedback chamber 47 is void of fluid pressure so that there is also no force exerted on actuating stem 26 in the opposite direction. Accordingly, bias springs 34,38 are effective to maintain closure of the respective poppet valves 30,32 and thereby establish the afore-mentioned lap condition of the self-lapping valve assembly 22. It will be appreciated that, in this lap position of self-lapping valve assembly 22, the end of operating lever 28 adjacent actuating stem end 27 is located vertically such that lever 28 lies in parallel, spaced-apart relationship with bearing surface 74 of cover 76. In this manner, subsequent movement of fulcrum member 66 along lever 28 is effective to vary the ratio of lever 28 without imparting any significant force component thereto.

When a brake application is desired, microprocessor unit MPU receives a command signal via control wire CW and determines therefrom a discrete position to which fulcrum member 66 is moved from its release position by the stepping action of motor M. In response to this movement of fulcrum member 66, operating lever 28 becomes a first class lever in transmitting the fixed force of power spring 54 to self-lapping valve assembly 22. Due to the mechanical advantage realized by the effect of operating lever 28, it will be understood that this fixed spring force is controlled in accordance with the positioning of fulcrum member 66 along lever 28 to vary the input force imparted to self-lapping assembly 22. This input force acts in a downward direction on actuating stem 26 due to rotation of control lever 28 about fulcrum roller 70 under the influence of power spring 54.

Such downward deflection of actuating stem 26 causes flange 48 of actuating stem end 29 to unseat supply poppet valve 32, while exhaust poppet valve 30 remains seated. Supply pressure at port 19 is communicated with brake cylinder device BC via the open supply valve, delivery chamber 42, passage 44, port 15 and pipe 16. As this brake cylinder pressure builds up, it becomes effective in feedback chamber 47 via branch passage 45 to exert an upward force on feedback piston 24 and hence actuating stem 26 to counteract the leveraged input force of spring 54. This causes counter rotation of operating lever 28 until supply valve 32 re-engages its seat 40. When this occurs, the self-lapping valve assembly is restored to its lap position in which both of the supply and exhaust valves are closed and lever 28 is returned to its original disposition in spaced, parallel relationship with bearing surface 74. The brake cylinder pressure thus realized is determined by the predetermined and controlled position of fulcrum roller 70 along operating lever 28 and the force exerted by spring 54 in lap position of the self-lapping valve assembly 22. It will be understood that for any brake command, the spring force exerted on lever 28 corresponds to the degree of compression to which spring 54 is adjusted in lap position of self-lapping assembly 22 and thus represents a fixed value in terms of determining the brake cylinder pressure. Therefore, the brake cylinder pressure is established in accordance with the lateral position of fulcrum member 66, which can be incrementally positioned by motor M to achieve brake cylinder pressure, as desired. The maximum brake cylinder pressure capable of being developed for any adjusted spring force exists when fulcrum member 66 is located in its rightward-most limit position.

Spring adjusting screw 58 allows each individual electro-pneumatic control unit to be calibrated. Screw 58 is adjusted to provide a specific brake cylinder output pressure with fulcrum roller 70 set by controlling motor M to a standard calibrating command position along lever 28. Such calibration effectively compensates for the inherent small mechanical and dimensional variations, including frictional resistance, for the motor, springs and structural components of individual electro-pneumatic control units.

In lap position, the brake cylinder pressure is maintained against leakage by reason of any pressure drop in feedback chamber 47 creating a force imbalance across operating lever 28 in a direction to again unseat supply poppet valve 32 to allow the supply pressure to compensate for the pressure drop and thereby maintain the brake cylinder pressure at a value corresponding to the command signal received by microprocessor unit MPU.

When a further increase in braking is desired, the command signal received by microprocessor MPU changes accordingly. As previously explained, motor M is operated to move fulcrum member 66 in a further rightward direction, thereby again changing the effective lever ratio. The fixed force of power spring 54 acting through lever 28 thus exerts greater downward force on actuating stem 26 of self-lapping valve assembly 22 than the counteracting force exerted by feedback piston 24 resulting from the existing feedback pressure effective in chamber 47. The resultant clockwise rotation of lever 28 forces actuating stem 26 downwardly to open supply valve 32, via which delivery pressure is supplied to brake cylinder device BC until the pressure in feedback chamber 47 corresponding to the effective brake cylinder pressure increases sufficiently to cause counter-rotation of lever 28. When the brake cylinder pressure effective in feedback chamber 47 is sufficient to re-establish the original rotational disposition of lever 28, supply valve 32 will close and the self-lapping valve assembly will have assumed its lap position.

When a reduction in the existing brake pressure is desired, an appropriate command signal is received at microprocessor MPU to cause motor M to retract fulcrum member 66 in a leftward direction. This changes the effective ratio of lever 28 such that the downward-acting force exerted on actuating stem 26 by power spring 54 decreases below the upward-acting force of feedback piston 24. The resultant force imbalance allows feedback piston 24 to move upwardly, causing flange 46 of actuating stem end 29 to engage and unseat exhaust poppet valve 30. The existing pressure of brake cylinder BC is thus vented to atmosphere via pipe 16, port 15, delivery chamber 42 and exhaust port 17, until the pressure in feedback chamber 47 corresponding to the effective brake cylinder pressure is reduced sufficiently to restore a force balance condition across lever 28. When this occurs, the self-lapping valve assembly will return to its lap position in which exhaust valve 30 is closed to terminate further venting of brake cylinder pressure. As previously explained, lever 28 is restored to its initial position in spaced-apart, parallel relationship with bearing surface 74, when self-lapping valve assembly 22 is in lap position, preparatory to a subsequent repositioning of fulcrum member 66.

When a full release of brake pressure is desired, the command signal at microprocessor MPU causes the microprocessor to operate stepping motor M such as to fully retract fulcrum member 66 until the fulcrum member engages limit stop 68 in full release position. In full release position, the aligned relationship of fulcrum roller 70 and bearing roller 72 with plunger stem 62 prevents the force of spring 54 from being transmitted to self-lapping valve assembly 22, which is thus effective to vent brake cylinder device BC until virtually complete exhaust of brake cylinder pressure is achieved.

I claim:

1. An electro-pneumatic controller for use in controlling pressure within a pneumatically operated device independent of pressure transducer(s) and solenoid valve(s), comprising:

(a) an operating lever having a predetermined position of rotation;

(b) input means for exerting a fixed force on said operating lever at one end thereof to cause rotation of said lever in one direction;

(c) self-lapping valve means including:
      (i) a supply port connected to a source of fluid under pressure, a delivery port connected to said pneumatically operated device, and an exhaust port;
      (ii) a normally closed supply valve between said supply port and said delivery port;
      (iii) a normally closed exhaust valve between said exhaust port and said delivery port;
      (iv) a feedback piston engageable with an other end of said operating lever to urge said operating lever in a direction opposite said one direction, said feedback piston having a pressure feedback chamber formed on one side thereof;
      (v) a feedback passage between said delivery port and said feedback chamber; and
      (vi) an actuating stem connected to said feedback piston and operatively arranged to open said supply valve in response to rotation of said operating lever in said one direction of rotation and to open said exhaust valve in response to rotation of said operating lever in said opposite direction;

(d) a movable fulcrum member about which said operating lever is rotatable in said one direction under the influence of said input means and in said opposite direction under the influence of said feedback piston, movement of said fulcrum member determining an extent to which said fixed force of said input means is conveyed via said other end of said operating lever to said feedback piston of said self-lapping valve means; and (e) electric motor means for controlling the position of said fulcrum member intermediate said one end and said other end of said operating lever to vary the effective ratio thereof thereby controlling operation of said supply and exhaust valves and thus whether fluid pressure is exhausted from, supplied to or maintained within said pneumatically operated device.

2. An electro-pneumatic controller as recited in claim 1, further comprising stop means for establishing first and second limits of movement of said fulcrum member toward said one end and said other end of said operating lever.

3. An electro-pneumatic controller as recited in claim 2, wherein said fulcrum member rotatably supports said operating lever at a location aligned coaxially opposite the point said input means acts on said operating lever when said fulcrum member is positioned in accordance with said first limit of movement thereof, and rotatably supports said operating lever at a location aligned coaxially opposite the point at which said feedback piston acts on said operating lever when said fulcrum member is positioned in accordance with said second limit of movement thereof.

4. An electro-pneumatic controller as recited in claim 1, wherein said input means comprises a helical spring.

5. An electro-pneumatic controller as recited in claim 4, wherein said input means further comprises means for adjusting the compression of said helical spring.

6. An electro-pneumatic controller as recited in claim 1, wherein said electric motor means comprises a stepping motor.

7. An electro-pneumatic controller as recited in claim 1, further comprising:
   (a) a first bearing surface formed by a body of said controller;
   (b) a second bearing surface formed by a surface of said operating lever opposite a surface thereof with which said input means and said self-lapping valve means is engaged; and
   (c) said fulcrum member having a bearing roller engaged with said first bearing surface and a fulcrum roller engaged with said second bearing surface.

8. An electro-pneumatic controller as recited in claim 7, wherein said operating lever is disposed in said predetermined position of rotation when said supply valve and said exhaust valve are in said normally closed position, said second bearing surface being in spaced-apart, parallel relationship with said first bearing surface in said predetermined position of rotation of said operating lever.

9. An electro-pneumatic brake control system for controlling pressure within brake cylinder(s) of a railroad car independent of pressure transducer(s) and solenoid valve(s) typically associated therewith, said electro-pneumatic brake control system comprising:
   (a) a source of fluid under pressure;
   (b) means for receiving an electric brake command signal;
   (c) processor means for computing a control signal in accordance with said brake command signal; and
   (d) electro-pneumatic brake control means for controlling amount of fluid pressure supplied from said source to and exhausted from said brake cylinder(s) in accordance with said control signal, said electro-pneumatic brake control means comprising:
      (i) an operating lever;
      (ii) input force means for exerting a constant force at one end of said operating lever to urge rotation thereof in a first direction;
      (iii) self-lapping valve means, engaged by an other end of said operating lever, for regulating fluid pressure within said brake cylinder(s) in response to a position into which said operating lever has been rotated;
      (iv) movable fulcrum means for establishing an effective ratio of said operating lever, movement of said fulcrum means determining said position of said operating lever and an extent to which said constant force of said input force means is conveyed to said self-lapping valve means; and
      (v) electric motor means for moving said fulcrum means intermediate said one end and said other end of said operating lever in response to said control signal and thereby controlling amount of said fluid pressure within said brake cylinder(s).

10. An electro-pneumatic brake control system as recited in claim 9, wherein said self-lapping valve means comprises:
    (a) a normally-closed supply valve between said source of fluid under pressure and said brake cylinder(s);
    (b) a normally closed exhaust valve between said brake cylinder(s) and atmosphere;
    (c) an actuating stem operatively engaged with a respective one of said supply and exhaust valves in an opening direction thereof; and
    (d) feedback piston means fixed to said actuating stem and subject to the fluid pressure effective within said brake cylinder(s) for exerting a force on said other end of said operating lever to urge said lever in a direction opposite said first direction to counteract said constant force exerted by said input force means at said one end thereof.

11. An electro-pneumatic brake control system as recited in claim 9, wherein said electric motor means comprises a stepping motor.

12. An electro-pneumatic brake control system as recited in claim 10, further comprising limit means for establishing first and second positions of adjacent said one end and said other end of said operating lever.

13. An electro-pneumatic brake control system as recited in claim 12, wherein said fulcrum means in said first position engages said operating lever in coaxial opposition with the point of engagement of said input force means therewith and in said second position engages said operating lever in coaxial opposition with the point of engagement of said feedback piston therewith.

14. An electro-pneumatic brake control system as recited in claim 13, wherein said input force means comprises a helical spring.

15. An electro-pneumatic brake control system as recited in claim 14, wherein said input force means further comprises means for adjusting the compression of said helical spring.

* * * * *